Dec. 9, 1969   R. L. WRINKLE ET AL   3,482,446
FLUID METER

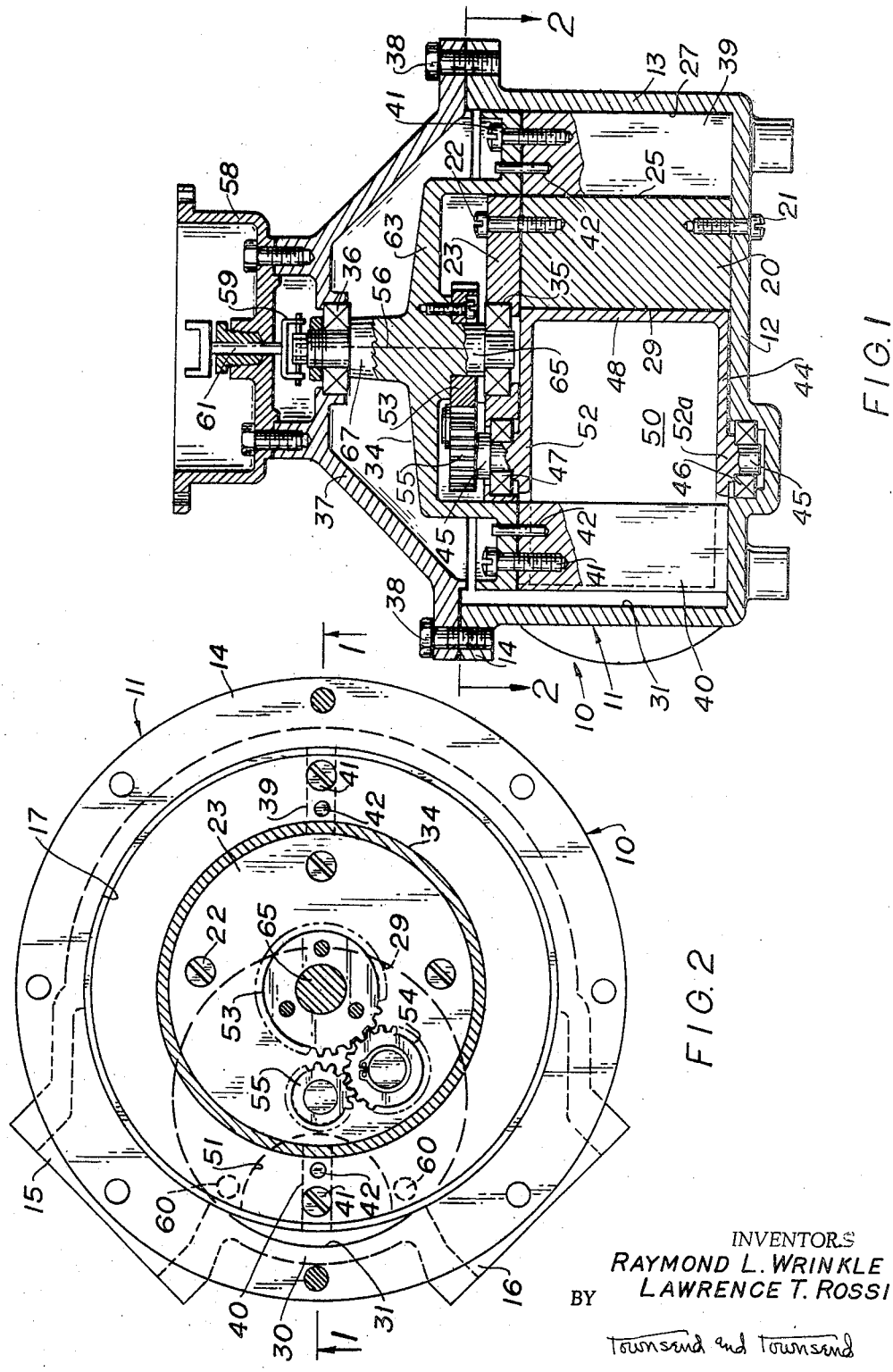

Filed April 25, 1966   4 Sheets-Sheet 2

INVENTORS
RAYMOND L. WRINKLE
BY   LAWRENCE T. ROSSI

Townsend and Townsend
ATTORNEYS

INVENTORS
RAYMOND L. WRINKLE
BY LAWRENCE T. ROSSI

Townsend and Townsend

ATTORNEYS

INVENTORS
RAYMOND L. WRINKLE
LAWRENCE T. ROSSI
BY Townsend and Townsend

ATTORNEYS

United States Patent Office 3,482,446
Patented Dec. 9, 1969

3,482,446
FLUID METER
Raymond L. Wrinkle, Oakland, and Lawrence T. Rossi, Albany, Calif., assignors to American Meter Company, Philadelphia, Pa., a corporation of Delaware
Filed Apr. 25, 1966, Ser. No. 544,964
Int. Cl. G01f 3/08; F01c 1/00, 3/00
U.S. Cl. 73—257                     14 Claims

ABSTRACT OF THE DISCLOSURE

A fluid meter having a casing provided with a fluid inlet and a fluid outlet and a stationary core member in the casing and forming therewith a channel communicating with the inlet and outlet. A rotor mounted within the casing for rotation has a plurality of vanes movable through the channel and a rotary gate blocks the region between the inlet and outlet and has a pocket means for passing the vanes through this region. Gear means interconnects the gate and the rotor to synchronize the rotation thereof to allow the pocket means to receive the vanes.

---

This invention relates to improvements in fluid meters and, more particularly, to a fluid meter of the type having a rotary gate sealing the inlet from the outlet thereof.

The fluid meter to which the invention is applied has a cylindrical bore, a crescent member in the bore to define therewith an arcuate fluid receiving channel extending from an inlet opening to an outlet opening, and a rotor having a number of vanes or blades within and movable through the aforesaid channel. To close the space or cavity in the bore between the inlet and outlet opening and to allow the vanes to move throughout the full circumferential extent of the bore, a rotary gate or seal having one or more outer peripheral recesses therein is provided in the cavity and is coupled in timed relationship to the rotor so that the recess or recesses will register with and thereby receive corresponding vanes as the rotor and the gate continue to rotate without interruption.

The improvements afforded by the present invention stem from the provision of gear means internally of the rotor for interconnecting the latter and the rotary gate to effect the synchronous rotation of these two components. The internal mounting of the gear means permits a gate of relatively large diameter to be used, one that can accommodate vanes of greater radial length. The channel formed by the bore and the crescent can thus be of relatively large volume so that the meter is adapted for use with a wider range of fluid flow rates than meters of conventional design.

The structure of the present invention eliminates a central rotor shaft which extends between the ends of the rotor. Thus, there is no obstruction across the axis of the rotor and, as a result, the rotary gate cooperable with the rotor can extend across the rotor axis. Thus, the radius of the gate can be relatively large so as to accommondate vanes of relatively long radial lengths.

Such gear means also allows the gate to rotate faster than the rotor with the result being that the vanes enter and leave corresponding recesses at a shallow angle. The vanes thus progressively penetrate and withdraw from the recesses in a manner to substantially eliminate any tendency for pulsations to be created in the fluid flow since there is virtually no net acceleration of the fluid as the vanes move into and out of the recess. The rotor therefore operates in a continuous, uninterrupted manner and provides greater accuracy in measuring the fluid through the meter.

Meters of this type have, in the past, generally utilized external gears to couple the rotor and rotary gate since the rotor could not, by its construction, contain the gears internally. External gears required that the rotor shaft extend completely through the axial extent of the channel-defining bore. In this way, the gears could be attached to the outer end of the rotor shaft and the adjacent outer end of the gate shaft to allow for simultaneous rotation thereof in timed relationship. The presence of the rotor shaft in the bore limits the maximum diameter of the gate since it must be located between the shaft and the outer periphery of the bore. This limitation restricts the depth of the vane receiving recesses of the gate and thereby permits each vane to have only a limited radial length. The volume of the channel through which the vanes pass is thus restricted in size and the meter must be operated within a relatively narrow range of fluid flow rates.

Another manner of interconnecting the rotor and the rotary gate is by the use of spaced, parallel pins joined together by thin discs positioned between the rotor and the gate. However, the rotational speeds of these two components are strictly limited to a 1:1 ratio. This is undesirable since smoother operation of the meter can be attained if the gate rotates faster than the rotor.

It is, therefore, the primary object of this invention to provide a fluid meter of the type described whose rotor and rotary gate are interconnected by gear means internally of the rotor itself whereby the rotor shaft need not extend through the bore of the meter and, as a result, the rotary gate can be relatively large to assure greater measuring capacity for the meter. The meter is thus able to be used over a relatively wide range of fluid flow rates.

Another object of the invention is to provide a fluid meter of the aforesaid character wherein the rotary gate rotates at a greater speed than the rotor so that the vanes of the rotor will gradually enter and leave the corresponding recesses of the gate to thereby substantially eliminate any pulsations in the fluid due to the interaction between the vanes and the gate.

Still another object of the present invention is the provision of a fluid meter having a rotor provided with a recessed base and vanes projecting laterally from the base at its outermost extremities whereby the rotor can be coupled to a rotary gate by means of gears within the base to thereby eliminate a shaft extension for mounting the rotor in an operative position.

A further object of the invention is the provision of a fluid meter of the type described which may have two or more vanes and can be operated at a relatively high speed to permit measuring of fluid flow rates of a relatively wide range of values.

Yet another object of this invention is to provide a fluid meter which operates with a minimum of fluid friction and turbulence over a wide range of flow rates and is particularly adapted for economical manufacture on a quantity production basis.

Other objects of this invention will become apparent as the specification progresses, reference being had to the accompanying drawings wherein:

FIG. 1 is a vertical section of a preferred embodiment of the invention;

FIG. 2 is a cross sectional view taken along line 2—2 of FIG. 1;

Figure 4:
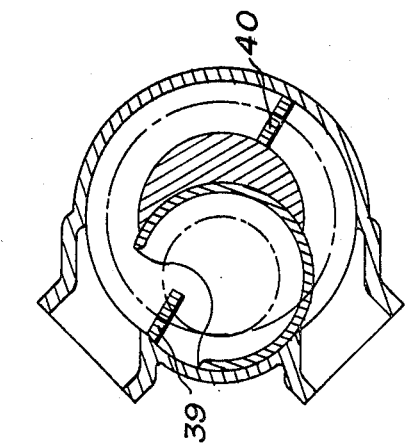
FIGS. 3–8 are schematic views of the meter showing successive positions of the vanes and the rotary gate as the rotor moves through an angle slightly less than 90°.

Referring to the drawings, the fluid meter generally designated 10 has a casing 11 which includes a bottom wall 12, a generally cylindrical side wall 13 and a radial flange 14. An inlet connection 15 and an outlet connection 16 are provided on the side wall 13 below the flange 14. The casing wall 13 has a concentric cylindrical bore 17 extending from the inlet 15 to the outlet 16.

A stationary crescent member 20 is fixed to the bottom wall 12 by suitable fastenings 21 and is connected by similar fastenings 22 to a stationary disc 23. The crescent member 20 and the stationary disc 23 are referred to collectively as the core member. The outer surface 25 of the crescent member 20 is concentric with the bore 17 and the surface 25 and 17 define an arcuate channel 27 communicating at one end with the inlet 15 and communicating at the other end with the outlet 16.

The inner surface 29 of the crescent member 20 defines a portion of the outer boundary of an offset cylindrical cavity 30 within the casing 11. Another portion of the cavity 30 is defined by the cylindrical surface 31 on the casing wall 13. The cavity 30 intersects the arcuate channel 27 in the region between the inlet 15 and outlet 16.

A rotor 34 having a hollow base 63 and a pair of stub shafts 65 and 67 is positioned with shafts 65 and 67 mounted on spaced respective bearings 35 and 36; the bearing 35 is mounted concentrically on the stationary disc 23 and the bearing 36 is mounted on the bonnet 37 attached to the casing flange 14 by means of fastenings 38. A pair of duplicate generally rectangular blades 39 and 40 are fixed on the rotor 34 by suitable fastenings 41 and aligning pins 42. The blades 39 and 40 are moved by fluid pressure through the arcuate channel 27 and across the portion of the offset cavity 30.

A gate 44 having the general shape of a cylinder closed at both ends is mounted to turn within the offset cavity 30. Gate 44 has aligned trunnions 45 mounted in axially spaced bearings 46 and 47. The bearing 46 is mounted on the bottom wall 12 of the casing 11 and the bearing 47 is mounted on the stationary disc 23. The outer surface of the cylindrical wall 48 of the gate 44 has close running clearance with the cylindrical surface 29 on the crescent member 20 and with the cylindrical surface 31 on the casing wall 13. The rotary gate 44 has a large internal space or pocket 50 and an entrance opening 51 in the side wall 48 and end walls 52 and 52a and leading into this pocket 50.

Gear means is provided within the interior of the rotor 34 for driving the rotary gate in timed relation with the rotation of the rotor 34. As shown in the drawings, this means includes a gear 53 fixed to shaft 65 of the rotor meshing with an idler gear 54 rotatably mounted on the stationary disc 23. The idler gear 54 also meshes with gear 55 fixed to one of the trunnions 45 on the hollow gate 44. In this form of the invention the rotary gate 44 has one entrance opening 51 and the rotor has two blades 39 and 40 and therefore the gear 53 has twice as many teeth as the gear 55, so that the rotary gate 44 turns at twice the speed of the rotor and in the same direction.

Figure 3:
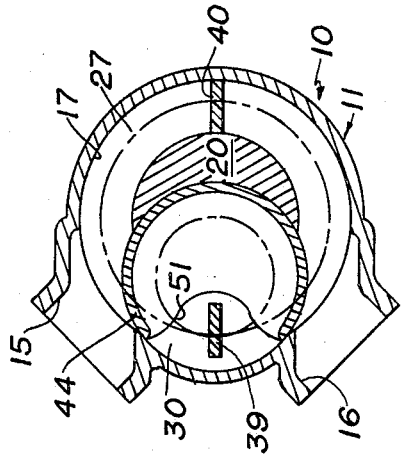

The hollow rotary gate 44 is mounted substantially internally of the rotor 34 and almost entirely within the outer boundary of the arcuate channel 27. The rotary gate 44 is so large in diameter that it is intersected by the axis 56 of the rotor 34. As stated in different terms, the offset cavity 30 for the hollow gate 44 has an outer wall 29 positioned between the axis 56 and the outer surface 25 of the crescent member 20. Fluid admitted into inlet 15 causes the rotor blades 39 and 40 to move in a clockwise direction as viewed in FIGS. 3–8. In FIG. 3, the blade 39 is shown in position at the center of the entrance opening 51. Neither of the blades ever contacts the rotary gate 44. It will be observed that the arcuate length of the entrance opening 51 at its maximum diameter is less than the arcuate length of the surface 31 on the casing. FIGS. 4, 5, 6, 7 and 8 show how the blade 39 moves out of the offset cavity 30 and into the arcuate channel 27 without contacting any part of the entrance opening 51.

The flow is smooth and unimpeded. The bladed rotor 34 and the hollow gate 44 turn in the same direction, and the blades enter and leave the gate with a minimum of turbulence. Pulsation is substantially eliminated, as the measuring chamber is uniform in size throughout the measuring cycle, and the blades do not displace any fluid from one side of the meter to the other. As each blade enters the rotary gate it displaces a volume of fluid equal to its volume back into the same side of the meter. This absence of pulsation is an important feature as it makes possible a high rate of speed without shock or excessive stress in the working parts.

Figure 5:
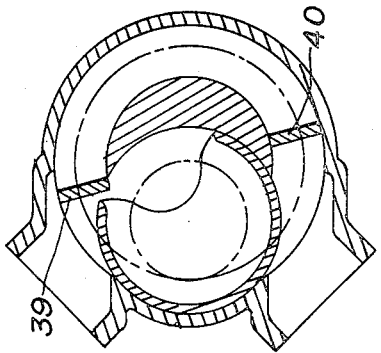
Figure 7:
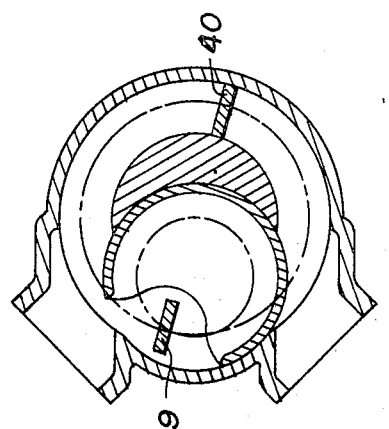
Figure 8:
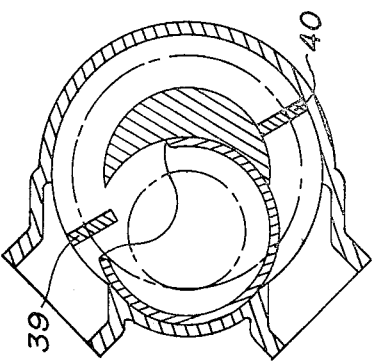
Figure 6:
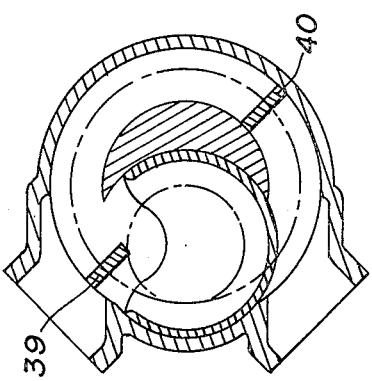

The way in which each blade enters the rotary gate can be shown by observing the blade action of FIGS. 3–8 in reverse order. Beginning with FIG. 8, it is seen that blade 39 is commencing to enter cavity 30 and does so at a shallow angle. In FIG. 7, blade 39 has penetrated further into cavity 30 as its distance from opening 51 increases. A fluid that is displaced by blade 39 will have space in which to move since the gap between gate 44 and blade 39 progressively widens. FIG. 6 shows the position of blade 39 after it has penetrated further into cavity 30. Again, it is disposed at an angle and the penetration is gradual enough to substantially eliminate any tendency for a net acceleration of the fluid in the meter to be developed. In this way, no pulsations can arise and the fluid flow through the meter is substantially continuous and uninterrupted. FIGS. 5, 4 and 3 in that order illustrate other positions of blade 39 within cavity 30. In all cases, the blade movement through the cavity is such as to avoid turbulence of the fluid and to result in a substantially zero net of flow of fluid outwardly of the cavity with respect to the fluid flow through channel 27.

There is no frictional contact between measuring elements to cause wear and loss of accuracy. The absence of friction also contributes to low pressure drop, and consequently to accuracy. A coupling yoke 59 is driven by the rotor 34 and serves to operate any suitable read-out device, not shown.

The unbalance of the hollow gate 44 caused by the recess cut away to provide the entrance opening 51 may be corrected by adding counterbalance weights 60 as shown diagrammatically in FIG. 2. The hollow construction of the gate 44 minimizes weight to reduce starting inertia, and provides freedom of movement of fluid within the pocket 50.

The top of meter 10 is closed by a flanged cover 58 adapted to receive the readout. The packing shaft 61 provided with a coupling at its lower end to engage rotor 34 and a coupling at its upper end to engage the readout device is sealed by suitable packing where it extends through the cover.

Prior devices of this general type in which the rotary gate is driven by gears differ from meter 10 in that the gears are located at the opposite end of the rotary gate with the idler gear mounted on an end wall corresponding to bottom wall 12. Thus, in prior devices, the shaft of the rotor would necessarily extend between the casing and the opposite end wall thereby restricting the diameter of the gate to a relatively low value. By positioning gears 53, 54 and 55 within base 63, this problem is avoided since there is no shaft extension required for mounting the gears adjacent to end wall 12. A larger diameter gate can be used which will accommodate a wider blade with a minimum of turbulence or compression of the fluid in channel 27. The width or radial length of the blade determines the width of the flow passage 27 and the volume of the measure chamber defined thereby in relation to the overall meter dimensions. In summary, the use of gears 53, 54 and 55 internally of rotor 34 makes possible a meter of larger fluid capacity for the same size, weight and cost as conventional devices.

Figure 9:
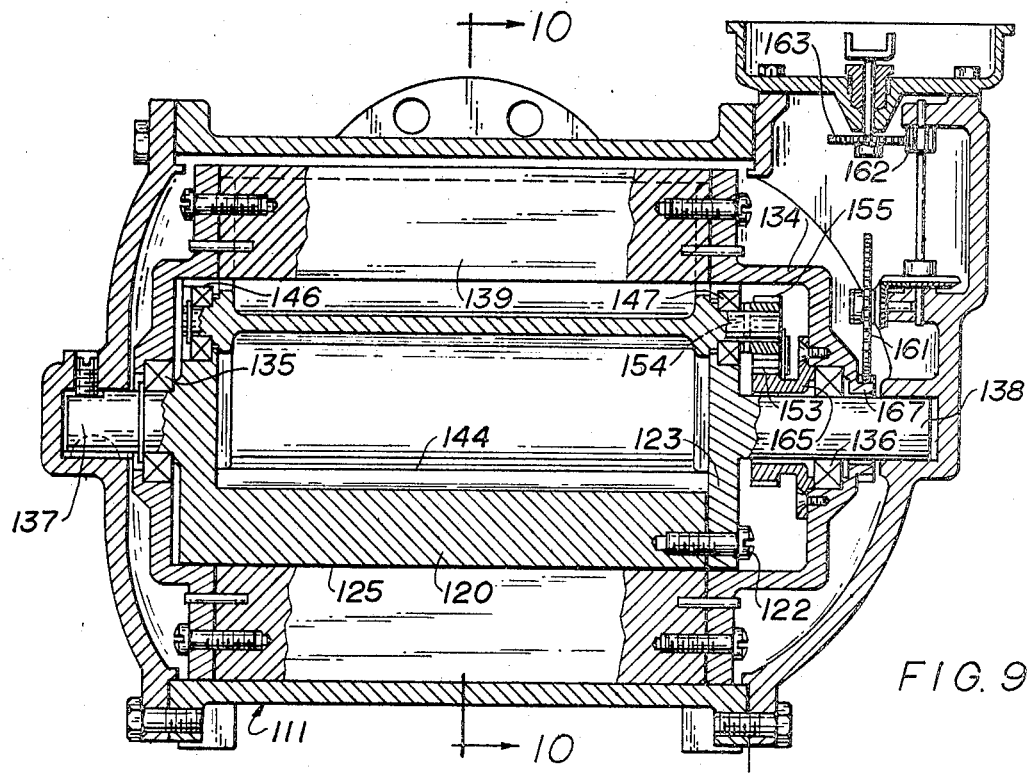
FIG. 9 is a vertical section of a second form of the fluid meter.
Figure 10:
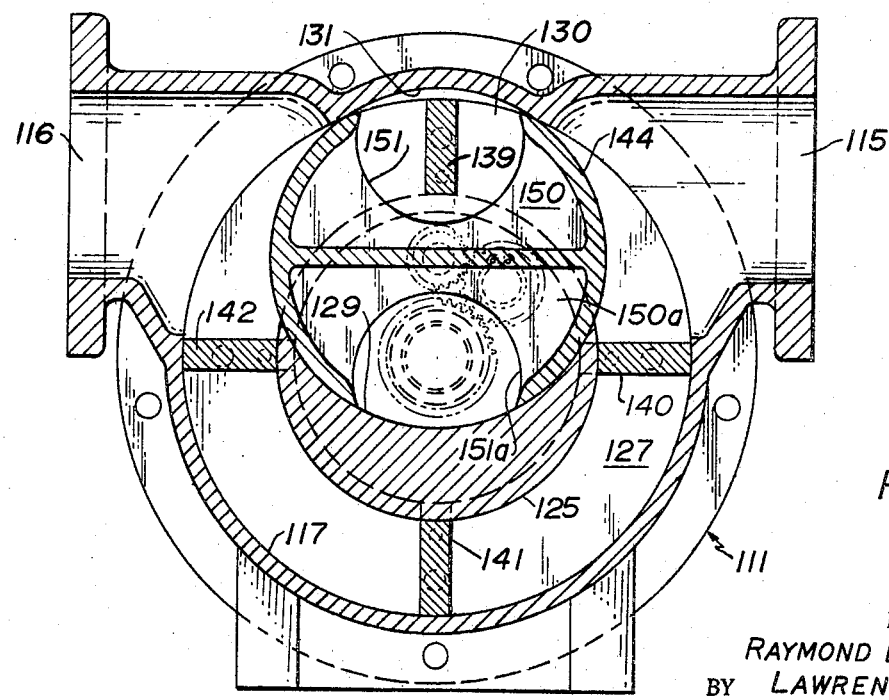
FIG. 10 is a cross sectional view taken along line 10—10 of FIG. 9.

In the modified form of the invention shown in FIGS. 9 and 10, the rotor 134 having a hollow base and stub shafts 165 and 167 is mounted horizontally, rather than vertically, and turns on axially spaced bearings 135 and 136 mounted on stationary trunnions 137 and 138 fixed on the stationary casing 111. The crescent member 120 is formed integrally with the trunnion 137 and is attached by fastenings 122 to the disc 123 which is formed integrally with the trunnion 138. The crescent member 120 and the stationary disc 123 are referred to collectively as the core member. The rotary gate 144 is supported on axially spaced bearings 146 and 147 carried on the trunnion member 120 and the disc 123. The arcuate channel 127 extending from the inlet 115 to the outlet 116 is defined between the concentric cylindrical bore 117 of the casing 111 and the outer cylindrical surface 125 of the crescent member 120. The offset cavity 130 is defined by the curved surface 129 on the crescent member 120 and by the curved surface 131 on the casing 111. In this form of the invention four blades 139, 140, 141 and 142 are provided on the rotor instead of two blades, and rotary gate 144 in the offset cavity 130 is provided with two internal pockets 150 and 150a. Entrance opening 151 communicates with pocket 150 and entrance opening 151a communicates with pocket 150a. The rotor blades 139 and 141 enter the entrance opening 151 and the rotor blades 140 and 142 enter the entrance opening 151a. Gearing is provided for driving the gate 144 in the same direction and at twice the speed of the rotor 134, as previously described.

The gearing for turning the gate 144 at twice the speed of the rotor 134 comprises a gear 153 fixed to shaft 165 of the rotor 134 and a gear 155 fixed to the gate 144. An idler gear 154 is rotatably mounted on the stationary disc 123 and meshes with both the gears 153 and 155. The gear 153 has twice the number of teeth as gear 155.

A gear train 161, 162, 163 is driven from the rotor 134 and serves to drive a readout device, not shown. Blades 139–142 interconnect bearing members 171 and 173 of rotor 134, allowing gate 144 to be disposed therewithin and to be of relatively large diameter.

The operation of the device shown in FIGS. 9 and 10 is similar to that previously described.

The form of the invention illustrated in FIGS. 9 and 10 allows rotor 134 to be relatively light in weight as compared with the cantilever or overhung blade rotor of prior devices. The rotor is hydraulically balanced in an axial direction to thereby eliminate end thrust. The blades supported at both ends may be relatively long and this, combined with added width, as previously explained, provides a high ratio of fluid capacity to overall size, weight and cost.

Figure 11:
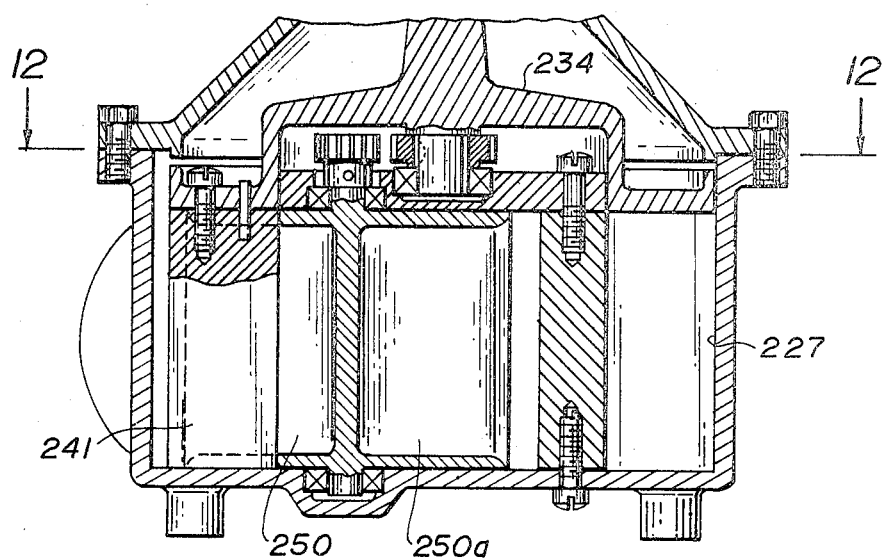
FIG. 11 is a vertical section through a third form of the fluid meter.
Figure 12:
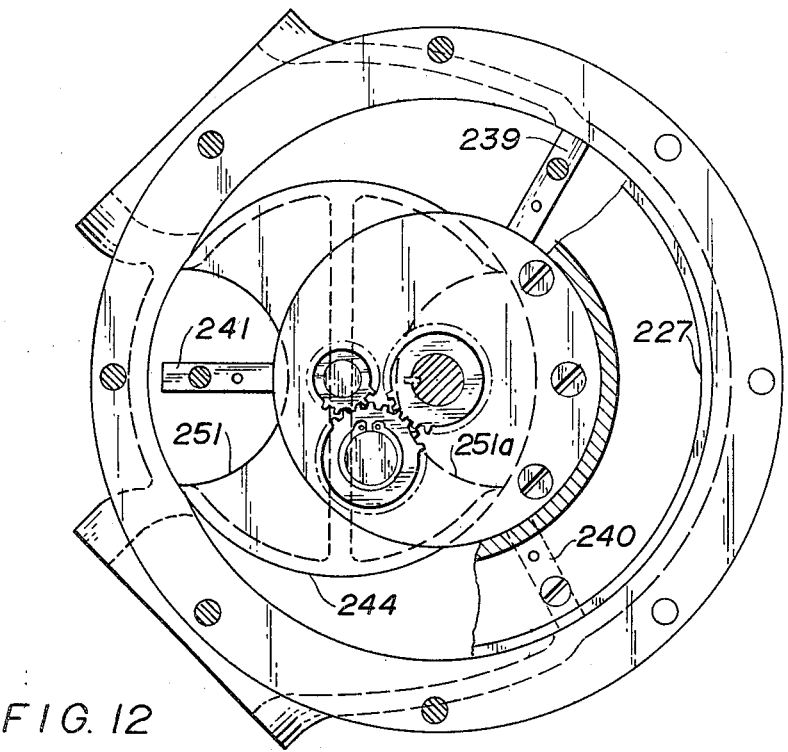
FIG. 12 is a cross sectional view taken along line 12—12 of FIG. 11.

In the modified form of the invention shown in FIGS. 11 and 12, the rotor 234 is provided with three blades 239, 240 and 241 traveling in the arcuate channel 227.

The rotary gate 244 has two internal pockets 250 and 250a and two entrance openings 251 and 251a. The rotary gate 244 is driven through gearing from the rotor 234 so that the rotary gate makes three revolutions for each two revolutions of the rotor. Accordingly, each of the three rotor blades enters first one pocket and then the other of the rotary gate during operation of the device. In other respects the operation of the device is similar to that previously described.

As compared to the construction of the meter shown in FIGS. 1 and 2, rotary gate 244 of the form of the invention shown in FIGS. 11 and 12 is more readily balanced since it is symmetrical and rotates at a slower speed. This 3:2 speed ratio, using three blades, may be used in the type of the device shown in FIGS. 9 and 10 where the rotor is supported at both ends and where more than two blades are required to hold the ends of the rotor in alignment.

The present invention provides a meter which is highly accurate and which is operable over a relatively wide operating range of flow rates without developing pulsations in the fluid passing therethrough.

Having fully described our invention, it is to be understood that we are not to be limited to the details herein set forth but that our invention is of the full scope of the appended claims.

What is claimed:

1. In a fluid meter having a casing provided with a cylindrical bore, a fluid inlet, a fluid outlet spaced from said inlet, and a core member within the bore and defining therewith an arcuate channel communicating at respective ends with said inlet and said outlet and a cylindrical cavity intersecting the channel between the inlet and outlet, the combination with said core member of: a rotor having a hub and an axis of rotation, a flange support spaced from said core member and connected to and extending laterally from said hub so as to have a radial and axial component of direction, and an annular flange disposed in a plane perpendicular to said axis of rotation and secured to the outer end of said flange support, the space between said flange support and said core member defining a recess for gear means; a plurality of spaced blades secured to the flange and extending axially therefrom, said rotor being concentrically positioned and rotatable relative to said bore with the core member being in substantial sealing relationship with the inner periphery of the flange and with said blades extending into and through said channel for movement in a direction from said inlet to said outlet; a cylindrical gate having a pocket in the outer periphery thereof; means coupled with said gate for mounting the same within said cavity for rotation relative to the rotor with the gate disposed to seal said inlet from said outlet; and gear means within said recess for interconnecting the rotor and the gate to effect synchronous rotation of the latter relative to the rotor and thereby assure periodic registry of the pocket and the blades as the rotor and gate rotate in the casing.

2. In a fluid meter as set fourth in claim 1, wherein said annular flange has a cylindrical inner surface, and wherein is included a disc defining a part of said core member, at least a part of said disc extending into the annular flange and being in sealing relationship to the inner surface thereof, a portion of said gear means being coupled to and supported by said disc.

3. In a fluid meter as set forth in claim 2, wherein said rotor has a central shaft in said flange support and concentric to said inner surface, and bearing means journalling said shaft on said disc, said blades being cantilevered on said annular flange.

4. In a fluid meter as set forth in claim 2, wherein is provided a pair of spaced shafts disposed axially of said rotor and forming parts of said core member, one of said shafts being secured to said disc, and bearing means coupling the opposite ends of said rotor on respective shafts for rotation relative thereto.

5. In a fluid meter as set forth in claim 1, wherein said rotor includes a second flange support and an annular flange therefor, said blades being secured to and extending between said flange, and wherein is included a pair of plates adjacent to respective annular flanges and forming parts of said core member, each plate having a shaft secured thereto and extending outwardly therefrom with each shaft being axially disposed relative to the rotor, and bearing means mounting each flange support on a respective shaft for rotation relative thereto.

6. In a fluid actuated device having a casing provided with a cylindrical bore, a fluid inlet, a fluid outlet spaced from said inlet, a stationary core member within the bore and defining therewith an arcuate channel communicating at respective ends with said inlet and said outlet and a cavity intersecting the channel between the inlet and the outlet, the combination with said core member of: a rotor having a hub and an axis of rotation, a flange support member spaced from said core member and connected to and extending laterally from said hub in a radial and axial direction, and an annular flange disposed in a plane perpendicular to said axis of rotation and secured to the outer end of said flange support member, the space between said flange support member and said core member defining a recess, there being a shaft coupled to one of said members and disposed within said recess substantially concentric with the flange; a plurality of spaced blades secured to the flange and extending axially therefrom, said core member being disposed at least partially within said flange in substantially sealing relationship to the inner surface thereof; bearing structure coupled to said shaft for rotatably mounting the rotor on said core member with the blades disposed within said channel and movable therethrough from said inlet to said outlet, said cavity extending across the axis of rotation of the rotor; a rotary gate having at least one pocket in the outer periphery thereof; means coupled with said core member for rotatably mounting the gate within said cavity for rotation relative thereto with the gate disposed to block the region between said inlet and said outlet; and gear means interconnecting the rotor and the gate to effect a synchronous rotation of the latter relative to the rotor to assure periodic registry of the pocket and a corresponding blade during rotation of the rotor and the gate.

7. In a fluid meter as set forth in claim 6 wherein the gear means is disposed within the recess and includes an idler gear rotatably mounted on the core member.

8. In a fluid meter as set forth in claim 6, wherein said rotor has an outer, circular wall extending transversely to the axis of the rotor, said shaft being secured to and extending through said rotor to present an inner shaft portion and an outer shaft portion, said bearing structure being connected to said core member and said inner shaft portion, the outer shaft portion having means for rotatably mounting the same on said casing.

9. In a fluid meter as set forth in claim 6, wherein said rotor has an outer, circular wall extending transversely to the axis of the rotor, said shaft being rigid to said core member and extending outwardly therefrom and through said outer wall of said rotor, the outer end of the shaft remote from said core member adapted to be secured to said casing, said bearing structure being disposed between said shaft and said outer wall of said rotor to mount said rotor on the shaft for rotation relative to said core member.

10. In a fluid meter: a casing having a fluid inlet and a fluid outlet; a stationary cylindrical core member within the casing and defining therewith an arcuate channel between the inlet and the outlet; a rotor mounted for rotation on said core member and having an annular flange extending radially across the channel to form a fluid seal with the casing and the core member, whereby the flange forms one boundary of the channel, said rotor defining a space adjacent to the seal and the axis of the rotor, said core member extending partially into said space; a plurality of spaced blades extending axially from the flange into the channel and disposed for movement by fluid pressure from said inlet to said outlet, said core member being provided with a cylindrical cavity having a central axis parallel with the axis of the rotor, said cavity having a radius greater than the distance between the axis of the cavity and the axis of the rotor, whereby the cavity extends across the axis of the rotor, said casing having an arcuate recess aligned with said cavity on the opposite side of the channel therefrom, said recess having an axis coincident with the axis of the cavity and having a radius of curvature equal to said radius of the cavity; a cylindrical gate having at least one opening in its outer periphery and mounted in said cavity and said recess for rotation relative to and in sealing relationship with said core member and said casing, the opening in said gate having an arcuate length less than that of said recess, whereby said gate blocks the region between the inlet and the outlet; a first gear mounted on the rotor; and a second gear mounted on said gate and coupled to said first gear to effect a synchronous rotation between the gate and the rotor sufficient to cause each blade to be received in said opening of the gate when the blade passes through said region.

11. In a fluid meter as set forth in claim 10, wherein said first and second gears are concentrically mounted on said rotor and said gate respectively and disposed within said space.

12. In a fluid meter as set forth in claim 11, wherein said core member has an end face within said cylindrical space, and wherein is included an idler gear rotatably mounted on said end face of the core member and interconnecting said first and second gears.

13. In a fluid meter as set forth in claim 10, wherein said core member has a pair of opposed ends and a pair of shafts secured thereto and extending outwardly from respective ends thereof, said shafts being coincident with the axis of said rotor and secured to said casing, said rotor being journalled on said shafts for rotation relative thereto.

14. In a fluid meter as set fourth in claim 10, wherein said rotor has a circular end wall and a pair of shafts secured to said end wall and extending outwardly therefrom in opposed directions, one of the shafts being journalled in said core member and the other shaft being journalled in said casing.

References Cited

UNITED STATES PATENTS

| | | | |
|---|---|---|---|
| 226,829 | 4/1880 | Bergquest | 91—95 |
| 680,068 | 8/1901 | Pickering | 91—95 |
| 912,549 | 2/1909 | Fagan | 230—150 |
| 940,587 | 11/1909 | Fagan | 230—150 |
| 1,234,262 | 7/1917 | Bateman | 91—95 |
| 1,408,839 | 3/1922 | Sparrow | 103—130 |
| 1,994,397 | 3/1935 | Loveridge et al. | 103—125 |
| 2,787,963 | 4/1957 | Dolan et al. | 103—126 |
| 3,134,337 | 5/1964 | Paschke | 123—8 |
| 3,304,781 | 2/1967 | Stevenson | 73—253 |

FOREIGN PATENTS 977,510   4/1951   France.

RICHARD C. QUEISSER, Primary Examiner

R. S. SALZMAN, Assistant Examiner

U.S. Cl. X.R.

91—95